(12) United States Patent
Uehira et al.

(10) Patent No.: US 8,767,066 B2
(45) Date of Patent: Jul. 1, 2014

(54) INFORMATION PROVISION DEVICE USING RETRO-REFLECTING ARTICLE

(75) Inventors: Kazutake Uehira, Tokyo (JP); Masahiro Suzuki, Saitama (JP)

(73) Assignee: Empire Technology Development LLC, Wilmington, DE (US)

( * ) Notice: Subject to any disclaimer, the term of this patent is extended or adjusted under 35 U.S.C. 154(b) by 1002 days.

(21) Appl. No.: 12/645,496

(22) Filed: Dec. 23, 2009

(65) Prior Publication Data
US 2011/0149064 A1 Jun. 23, 2011

(51) Int. Cl.
*H04N 7/00* (2011.01)
*H04N 7/18* (2006.01)
*H04N 9/47* (2006.01)

(52) U.S. Cl.
USPC .......................................... 348/118; 348/113

(58) Field of Classification Search
USPC ........... 348/113, 118; 340/572.1; 250/559.22; 382/104, 154; 396/175; 701/201
See application file for complete search history.

(56) References Cited

U.S. PATENT DOCUMENTS

| | | | |
|---|---|---|---|
| 6,600,168 B1 * | 7/2003 | Geng | 250/559.22 |
| 6,996,339 B2 * | 2/2006 | Miyoshi et al. | 396/175 |
| 2003/0059088 A1 * | 3/2003 | Culp et al. | 382/104 |
| 2008/0013826 A1 * | 1/2008 | Hillis et al. | 382/154 |
| 2008/0278328 A1 * | 11/2008 | Chand et al. | 340/572.1 |
| 2010/0017111 A1 * | 1/2010 | Stefani | 701/201 |

* cited by examiner

*Primary Examiner* — Allen Wong
(74) *Attorney, Agent, or Firm* — Ren-Sheng International (57) ABSTRACT

In accordance with embodiments of the present disclosure, an information provision device is presented. The information provision device may include an image searching unit configured to detect, from an image, a retro-reflective article and an article identification associated with the retro-reflective article. The device may also include a projecting unit configured to control projecting of an image pattern to the retro-reflective article. The device may further include a controller coupled with the image searching unit and the projecting control unit, wherein upon a determination that the retro-reflective article is relevant to a route, the controller is configured to generate the image pattern to be projected to the retro-reflective article.

20 Claims, 7 Drawing Sheets

(600) A computer program product (604) Machine-readable instructions, which, if executed by one or more processors, operatively enable a computer device to:

identifying a retro-reflective article based on an article identification extracted from an image; and     upon a determination that the retro-reflective article is relevant to a route, projecting a first pattern to the retro-reflective article.

| (606) A computer-readable medium | (608) A recordable medium | (610) A communications medium |
|---|---|---|

INFORMATION PROVISION DEVICE USING RETRO-REFLECTING ARTICLE

BACKGROUND

Unless otherwise indicated herein, the approaches described in this section are not prior art to the claims in this application and are not admitted to be prior art by inclusion in this section.

A conventional navigation device may provide route guidance by finding the current location of the device using the Global Positioning System (GPS), and by determining a route from the current location to a destination based on maps stored in a storage device, such as a DVD or a disk drive. The current location and the route guidance may be displayed on the screen of the device. When a conventional navigation device is installed in a vehicle, the screen of the device may be placed in the control panel of the vehicle or attached to the windshield of the vehicle. A driver is often unable to look at the in-vehicle screen of the navigation device while still paying full attention to the road ahead.

A conventional navigation device may also employ a voice guidance system to inform a driver to turn at an intersection or exit a highway. When two roads or intersections are located very close to each other, the navigation device may not distinguish these roads or intersections, and the voice guidance may only provide ambiguous information such as "make a left turn soon." As a result, the driver may have to take his/her eyes off the road in order to further examine the map supported by the navigation device.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs, and systems related to an information provision device using retro-reflective article. Throughout the disclosure, the term "retro-reflective article" may broadly refer to an object having a surface that can retro-reflect light waves. A surface may be "retro-reflective" when a light wave emitted from a source is reflected by the surface back to the same source. Thus, unlike diffusing-reflection, in which light wave may be reflected to all directions, when a light wave hits a retro-reflective surface, the reflected light wave may be parallel to the original light wave and may have an opposite traveling direction. Throughout the disclosure, the term "image pattern" may broadly refer to an image or a laser-beam generated figure that can be projected to a retro-reflective article. For example, an image pattern may be an image with multiple graphic components (e.g., lines, boxes, circles, and others), each of which having different color and/or light intensity. Thus, when an image pattern is projected onto a retro-reflective surface, the reflected-back image may have some areas of the surface highlighted, while other areas darkened.

Figure 1:
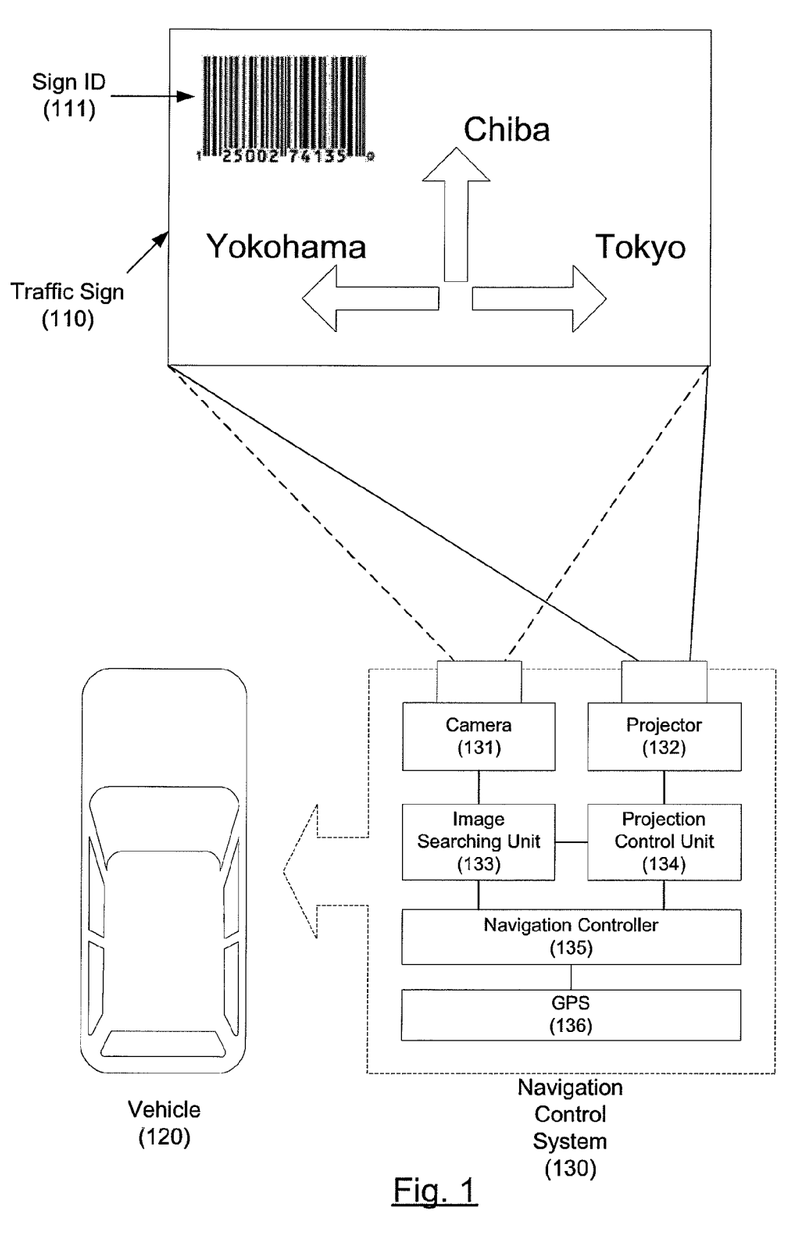
FIG. 1 illustrates an example information provision device using a retro-reflective article.

FIG. 1 illustrates an example information provision device, a navigation control system 130, using a retro-reflective article, in accordance with at least some embodiments of the present disclosure. FIG. 1 includes a retro-reflective article in the form of a traffic sign 110. The traffic sign 110 may have a surface that is retro-reflective, and contain an article identification in the form of a sign id 111. A vehicle 120 may have the navigation control system 130 to provide navigational information to a driver of the vehicle. The navigation control system 130 may contain a camera 131, a projector 132, an image searching unit 133, a projecting control unit 134, and a navigation controller 135. The navigation control system 130 may optionally contain, or be connected with, a global positioning system (GPS) 136.

In one implementation, a retro-reflective article may contain a base substance (such as a board or a three-dimension structure) with a surface for displaying information. The article may also include a retro-reflective mechanism. One example retro-reflective mechanism may correspond to a layer of retro-reflective materials (e.g., glass beads, micro-prisms, and others) being applied onto the surface of the article. Another example retro-reflective mechanism may correspond to retro-reflective optical elements, such as perpendicular mirrors or spherical mirrors, being integrated into the article. In one implementation, a traffic sign 110, which has a base board or a cylinder-like shape for displaying traffic-related information, may be a retro-reflective article having incorporated a retro-reflective mechanism. Any existing traffic sign may also be converted into a retro-reflective article by applying the retro-reflective material on the displaying side of the traffic sign. Alternatively, the article may be originally plain and solid, without any information on its surface. Any image pattern projected onto such an article may be seen without any interference. Further, the retro-reflective mechanism of the traffic sign 110 may not obstruct the traffic information already printed on its surface. For example, the original traffic information on the traffic sign 110 should still be visible when a new image pattern is projected onto it.

In one implementation, the traffic sign 110 may be a sign along a road to provide information. For example, the traffic sign 110 may use, without limitation, pictorial or standardized signs, symbols and/or words to direct traffic. The traffic sign 110 may also contain the name of a road, a place, a direction, and/or a destination. For example, in FIG. 1, the traffic sign 110 may indicate an intersection with a road turning left to Yokohama, a road turning right to Tokyo, and a road leading toward Chiba. When the traffic sign 110 is retro-reflective, and when an image pattern emitted from a vehicle 120 is projected onto the traffic sign 110, the image pattern may be reflected and directed back to the vehicle 120 and its driver, but not to other directions which might disturb other drivers and road users. Further, the projected image pattern may be customized according to a vehicle's current position and its destination, thereby allowing the traffic sign 110 to be individualized for different drivers.

In one implementation, a retro-reflective article may contain an article identification to identify and distinguish the article. For example, the traffic sign 110 may have an incorporated sign id 111. During operation, the sign id 111 may be detected by the navigation control system 130, regardless of whether it is visible or not. In one implementation, the sign id 111 may be a two-dimensional barcode printed on the surface of the traffic sign 110. Thus, the navigation control system 130 may function as a barcode scanner to quickly detect and read the sign id 111, even from a certain distance. The sign id 111 may also be implemented by a radio-frequency identification (RFID) chip embedded in the traffic sign 110, allowing the navigation control system 130 with a RFID receiver to quickly pick up the RFID sign id 111.

In one implementation, the sign id 111 may contain geographic and descriptive information that can be used to identify the specific traffic sign 110. For example, the sign id 111 may include information about the current location of the traffic sign 110, as well as the direction the traffic sign 110 is facing. It may also contain the name of the specific road the traffic sign 110 is on, and the position the traffic sign 110 is on this road. The sign id 111 may also indicate the type of the traffic sign 110. For example, the traffic sign 110 may be an intersection direction sign that contains multiple directions and their corresponding destinations, as illustrated in FIG. 1, or a road name sign, etc. Alternatively, the above geographic and descriptive information may be retrieved from a database based on the sign id 111. For example, when the GPS system 136 is embedded in or connected with the navigation control system 130, the above geographic and descriptive information may be retrieved from a database of the GPS system 136 based on the traffic sign 110. Further, such information may also be obtained from a remote database via a wired or wireless network.

In one implementation, the vehicle 120 may be equipped with the navigation control system 130 to provide comprehensive navigation functions. The navigation control system 130 may include a camera 131 to capture images of the environment in front of or surrounding the vehicle 120. During driving, the camera 131 may continuously capture still images or video clips from the perspective of the vehicle 120. In one implementation, the images captured by the camera 131 may contain one or more traffic signs 110 with corresponding sign ids 111. The captured images may then be transmitted to an image searching unit 133 for detecting of the traffic signs 110 and the sign ids 111.

In one implementation, the image searching unit 133 may be configured to search target articles (e.g., traffic signs) from an image. The image searching unit 133 may conduct this search by detecting a specific pattern from the image. For example, when a sign id 111 has a pattern similar to a barcode, the image searching unit 133 may act as a barcode scanner during operation, and may extract one or more sign ids 111 from the image. The details about extracting traffic signs 110 and its associated sign ids 111 are further described below.

In one implementation, a navigation controller 135 may be connected with the image searching unit 133 to receive the detected sign ids 111 and/or traffic signs 110 from the image searching unit 133. Further, the navigation controller 135 may serve as an interface with other devices or components such as the GPS 136. The GPS 136 may provide positioning, navigation, and timing services to the vehicle 120. For example, when the GPS 136 provides routing guidance such as "turn right in about 300 meters," the same routing guidance may be transmitted to the navigation controller 135 as a request for information provision. Once the navigation controller 135 obtains the traffic signs 110 from the vehicle's surrounding environment, it may determine which traffic signs 110 may be relevant to the routing guidance, and generate one or more image patterns to be projected onto these traffic signs 110. The details about determining relevant traffic signs and projecting image patterns to these traffic signs are further described below.

In one implementation, the navigation controller 135 may forward the generated image patterns to a projection control unit 134. The projecting control unit 134 is configured to control a projector 132 for projecting the image patterns to the traffic signs 110. Further, the projecting control unit 134 may receive the location of a particular traffic sign 110 either from the image searching unit 133 or from the navigation controller 135. Thus, the projecting control unit 134 may determine a projecting angle from the vehicle 120 to the particular traffic sign 110, and subsequently control the projector 132 in order to project the image pattern to the traffic sign 110 using the projecting angle. The projector 132 may convert a graphic image pattern into a high intensity light wave, and project the light wave from the vehicle 120's direction toward the particular traffic sign 110. Alternatively, the projector 132 may project laser-beam figures. The details about controlling the projector 132 are further described below.

Figure 2:
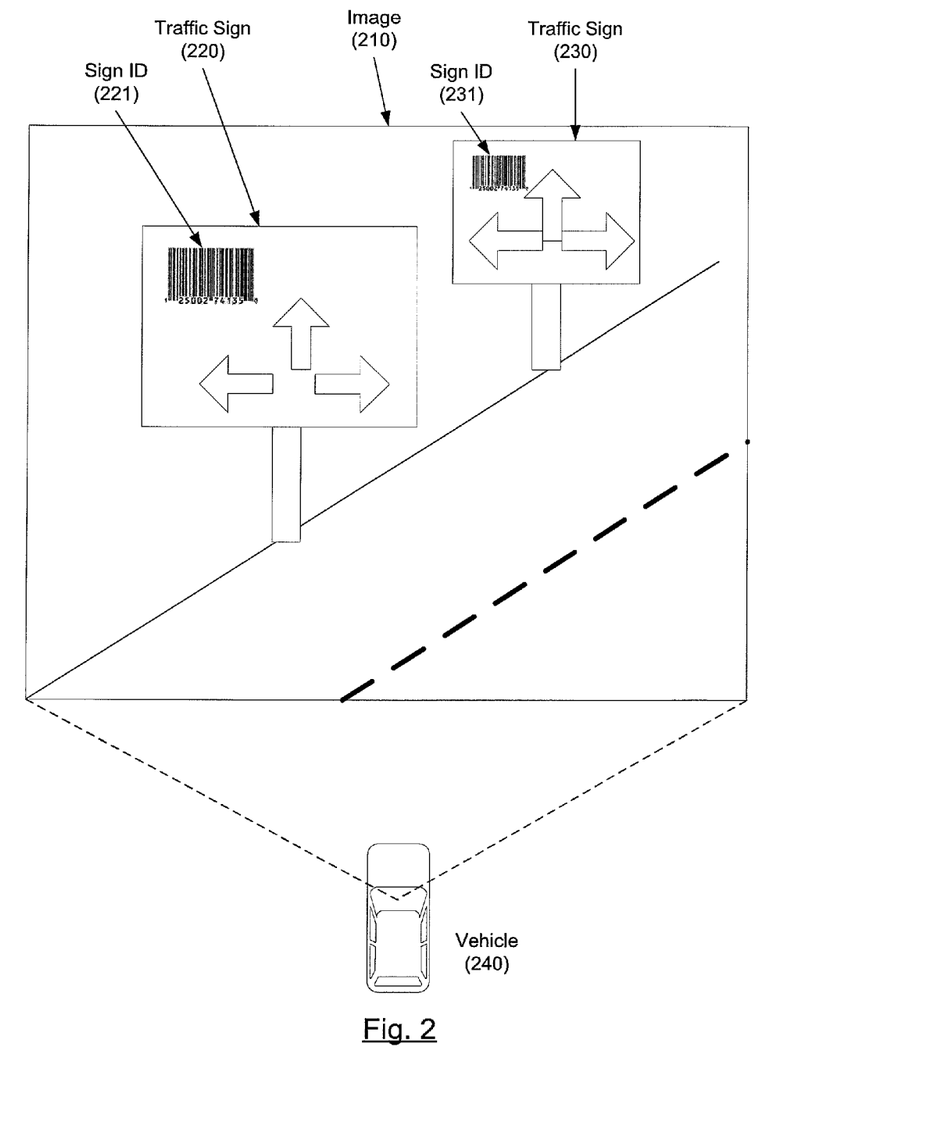
FIG. 2 illustrates an exemplary image captured by a camera of a navigation control system.

FIG. 2 illustrates an exemplary image captured by a camera of a navigation control system, in accordance with at least some embodiments of the present disclosure. The captured image 210 may be a still image or an image frame extracted from a video clip. In one implementation, the image 210 may be captured by a camera 131 of FIG. 1 from the perspective of a vehicle 240, and may be transmitted to an image searching unit 133 of FIG. 1 for further processing. For example, in FIG. 2, the image 210 may show, from the perspective of a vehicle 240, a left-front side view illustrating two traffic signs being placed on the left side of the road. Further, the image 210 may be captured when the vehicle 240 is moving or parked.

In one implementation, the image 210 may contain one or more retro-reflective articles (e.g., traffic signs) that have article identifications (e.g., sign ids). In the example illustrated in FIG. 2, the image 210 may include two traffic signs 220 and 230, each of which contains a sign id 221 and a sign id 231, respectively. The image searching unit of a navigation control system may scan image 210 in order to detect the presence of these sign ids and/or traffic signs. In one implementation, the sign ids 221 and 231 may be barcode patterns. Thus, by detecting the presence of barcode patterns, the sign ids 221 and 231 may be extracted from the image 210. Additional details, such as the geographic and descriptive information about the traffic signs 220 and 230, may be decoded from, or retrieved based on, the sign ids 221 and 231. For example, the sign ids 221 and 231 may be encoded with information that can pinpoint the exact geographic location of the traffic signs 220 and 230. The sign ids 221 and 231 may further contain descriptions of the type of signs the traffic signs 220 and 230 are displaying.

In one implementation, based on the sign ids 221 and 231, the traffic sign 220 and 230 may be identified from the image 210. For example, if the sign ids 221 and 231 are placed by default on the top left corners of the traffic signs, then the image searching unit may detect the edges of the traffic signs 220 and 230 in the image 210 by starting from the positions of the sign ids 221 and 231. Once the sign ids and the traffic signs are detected, their respective positions in the image 210 are recorded for further determinations of projecting angles. The determined projecting angles may be used for projecting image patterns onto the traffic signs 220 and 230.

In one implementation, the traffic signs 220 and 230 may be detected from the image 210 based on light reflected from their retro-reflective surfaces. For example, the traffic signs 220 and 230 may be printed with a special color that is easily distinguishable from the other elements in the image 210. In another example, the vehicle 240 may first emit a special type of light (e.g., light with a certain color, infrared light, ultraviolet light, laser light, etc.) toward the surrounding area. After the emission, the image 210 may be filtered to allow certain specific light to be present in the images 210. Since more light may be reflected back from the retro-reflective traffic signs than from other objects, the image searching unit may determine that any graphic element in the image 210 having a light intensity that is above a predetermined threshold should be deemed traffic signs. Thus, the filtered image 210 may contain graphic elements that resemble the retro-reflective traffic signs 220 and 230. Afterward, additional scanning process may be conducted on the filtered image 210 to extract sign ids 221 and 231 from the detected traffic signs 220 and 230.

In one implementation, if no sign id or traffic sign is detected in the image 210, then the image searching unit may pick another image from the same or different viewing direction, and repeatedly perform the above sign id and traffic sign detection function. During night time, the navigation system may take advantage of the vehicle 240's headlights in capturing images. If the headlights emit a special light, then the image searching unit may perform the above filtering function. Afterward, the detected sign id may be deemed an article identification for further processing, and the detected traffic signs may be used for displaying projected image patterns for the driver of the vehicle 240.

Figure 3:
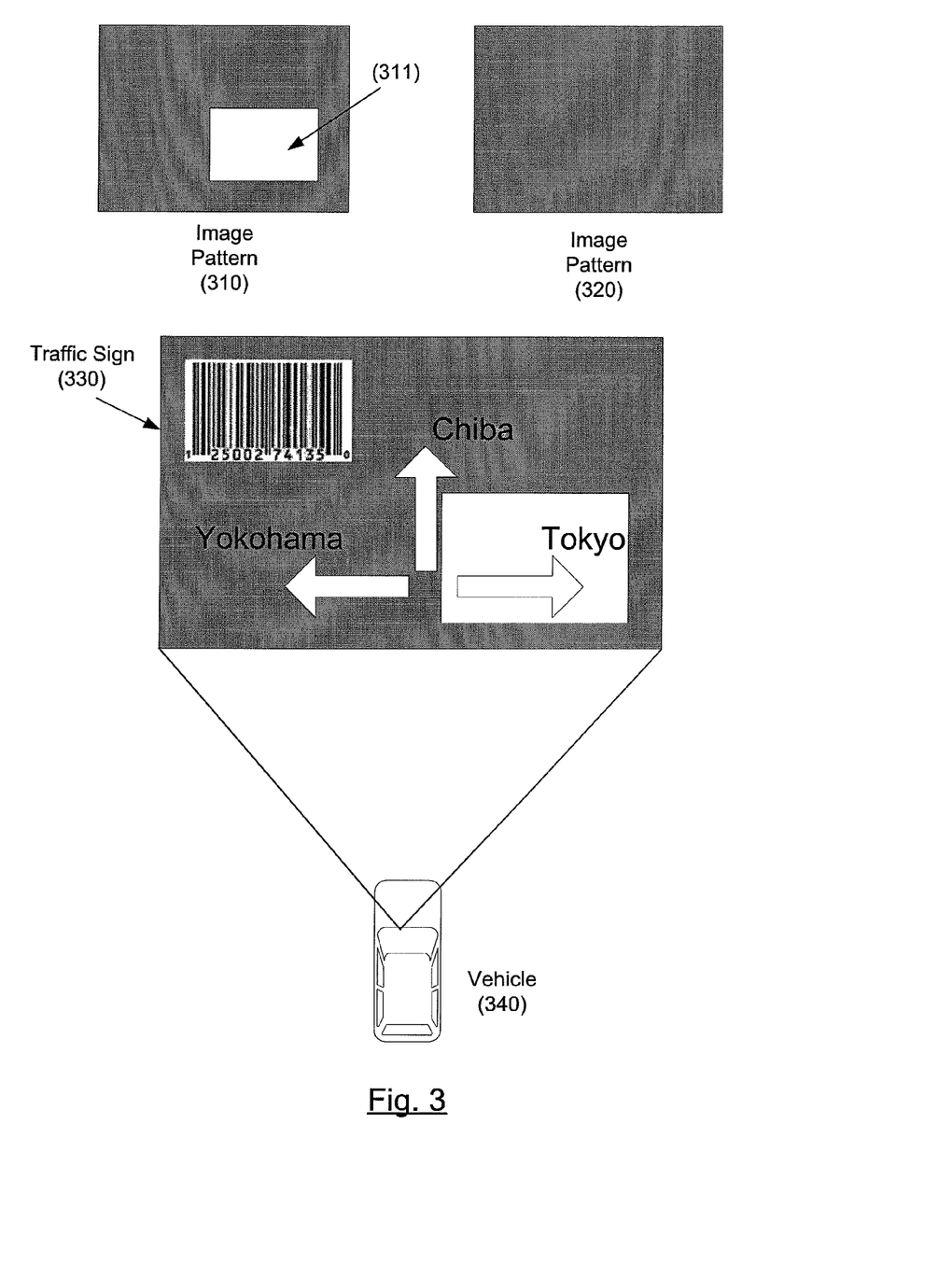
FIG. 3 illustrates exemplary image patterns and pattern projecting control.

FIG. 3 illustrates exemplary image patterns and pattern projecting control, in accordance with at least some embodiments of the present disclosure. In FIG. 3, two image patterns 310 and 320 may be generated by a navigation controller 135 of FIG. 1, and may be projected by a projector 131 of FIG. 1 under the control of a projection control unit 134 of FIG. 1. The image patterns 310 and/or 320 may be projected from a vehicle 340 onto a retro-reflective article such as a traffic sign 330. Because of the characteristics of a retro-reflective article, lights or laser beams projected from the vehicle 340 may be reflected back to the vehicle 340, but not to any other directions. Thus, the projected image patterns 310 and/or 320 may be uniquely used to provide information to the driver of the vehicle 340.

In one implementation, the traffic sign 330 may be deemed relevant to the routing guidance of the GPS, and an image pattern 310 may be generated to help the driver navigating the road. The image pattern 310 may be a rectangular graphic image with low or no light intensity, except for a small area 311 within the image pattern 310. The small area 311 may be colored with white or a bright color that has high light intensity. Thus, as illustrated in FIG. 3, when the image pattern 310 is projected onto a retro-reflective article, the contrast between the low intensity dark surrounding area and the high intensity bright small area 311 may trick the eyes of a viewer as seeing the traffic sign 330 being covered with dark shade of gray or "black" color, with the lower right quarter of the traffic sign 330 being illuminated. Thus, the highlighted lower right quarter of the traffic sign 330 may provide an indication to the driver that the navigation control system is suggesting to him/her to turn right toward "Tokyo", without requiring the driver to take his/her eyes away from the road.

In one implementation, a second image pattern 320, which may be a rectangular graphic image with low or no intensity light, may also be generated and projected onto the traffic sign 330. When alternatively and continuously projecting the image pattern 310 and the image pattern 320 onto the retro-reflective surface, the traffic sign 330 may show an effect that the lower right quarter of the traffic sign 330 is flashing or blinking. Thus, the driver of the vehicle 340 may easily spot the flashing portion of the traffic sign 330, without taking his/her eyes off the road. Hence, accompanied by the voice guidance of a GPS, the navigation control system with retro-reflective articles may greatly enhance the usability of the GPS and increase the safety of driving.

In one implementation, if a traffic sign is deemed not relevant to the routing guidance of a GPS, then no image pattern may be generated or projected onto it. Likewise, depending on whether to turn left or stay straight, the small bright area 311 may be moved to the lower left corner or to the center in the image pattern 310. Thus, the traffic sign 330 with its retro-reflective surface may encourage the driver not to move his eyesight off the road he/she is driving on in order to look at the screen of the GPS.

Figure 4:
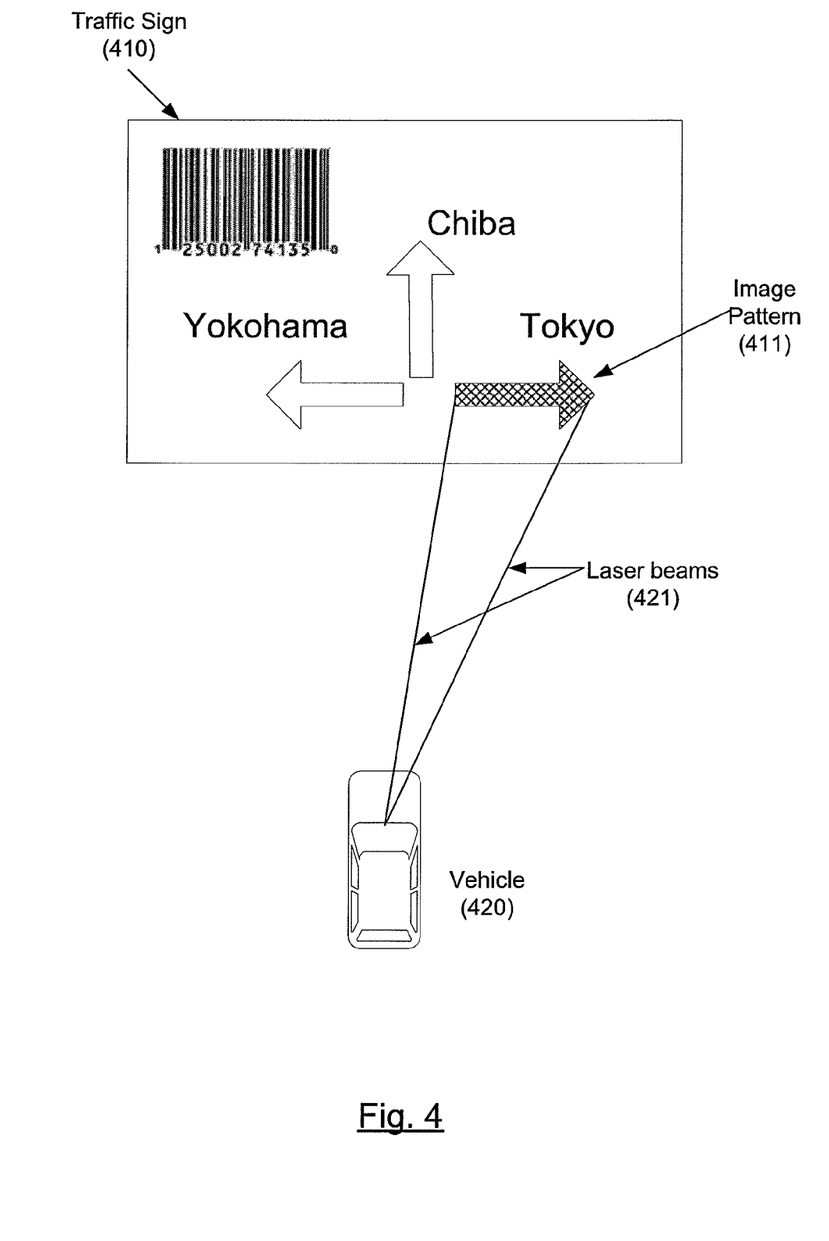
FIG. 4 illustrates a second exemplary image pattern and pattern projecting control.

FIG. 4 illustrates a second exemplary image pattern and pattern projecting control, in accordance with at least some embodiments of the present disclosure. In FIG. 4, an image pattern 411 may be controlled by a projection control unit and projected by a projector using laser beams. When one or more laser beams are illuminating and/or scanning an area, it may create an animation effect showing that the scanned area is filled with laser beam points and lines. By using mechanical or optical controlling mechanisms, the laser beams emitted from a projector may be adjusted to pointing to a specific direction and generating a laser beam image pattern 411. Thus, when projected onto the traffic sign 410, the laser beam image pattern 411 may be retro-reflected back to the vehicle 420, and provide a highlighted or blinking area on the traffic sign 410 for the driver's attention.

In one implementation, when a vehicle is moving, the traffic signs along the road the vehicle is traveling on may be changing all the time. Thus, in order to project an image pattern onto a particular traffic sign, the projector control unit of the navigation control system may determine a projecting angle. And the projector of the navigation control system may adjust the projecting of the image pattern from the vehicle 420 to the traffic sign 410 using such a projecting angle. In one implementation, the projecting angle may be calculated based on the image captured by the camera of the navigation control system. For example, by determining the viewing angle of the traffic sign from the perspective of the camera lens, the same viewing angle may be used to derive the projecting angle, taking into consideration the physical characteristics of the projector and the time delays from the capturing of the image to the projecting of image pattern.

In one implementation, the projecting angle may further be refined based on the shape of the traffic sign and the angle of the traffic sign facing toward the vehicle 420. Thus, by evaluating the outline of the traffic sign in the image captured by the camera, and examining the details about the traffic sign derived from the sign id, the navigation control system may estimate the shape and angle of the image patterns as well as the ideal projecting angle that should be used to project the image patterns.

Figure 5:
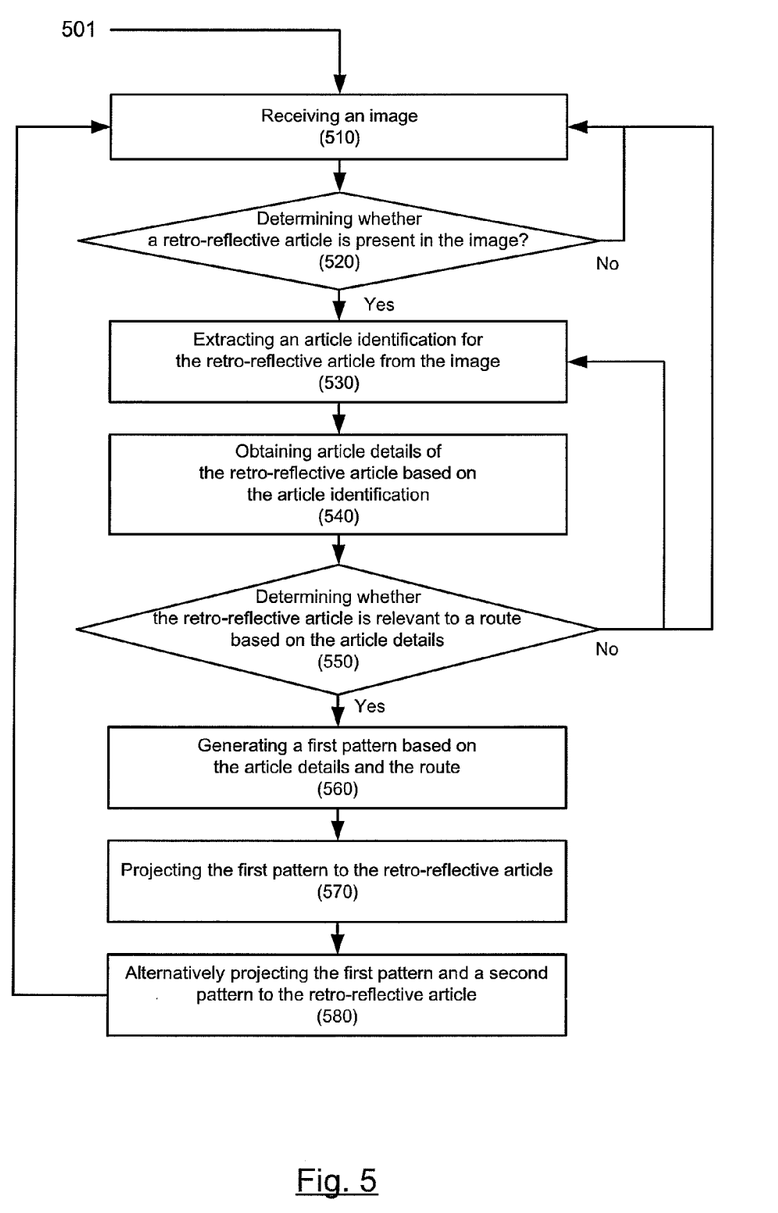
FIG. 5 is a flow diagram illustrating a process for operating an information provision device using a retro-reflective article.

FIG. 5 illustrates a flow diagram of an example process 501 for operating an information provision device, such as a navigation control system, using retro-reflective articles, in accordance with at least some embodiments of the present disclosure. The process 501 sets forth various functional blocks or actions that may be described as processing steps, functional operations, events, and/or acts, etc., which may be performed by hardware, software, and/or firmware. Those skilled in the art in light of the present disclosure will recognize that numerous alternatives to the functional blocks shown in FIG. 5 may be practiced in various implementations. In one embodiment, machine-executable instructions for the process 501 may be stored in memory, executed by a processor, and/or implemented in a navigation control system of FIG. 1.

Process 501 may begin at block 510, "receiving an image." Block 510 may be followed by block 520, "determining whether a retro-reflective article is present in the image." If the determination at block 520 is "No", then process 501 may proceed to block 510. If the determination at block 520 is "Yes", block 520 may be followed by block 530, "extracting an article identification for the retro-reflective article from the image." Block 530 may be followed by block 540, "obtaining article details of the retro-reflective article based on the article identification" At block 550, a determination of whether the retro-reflective article is relevant to a route is made based on the article details. When the determination at block 550 returns "Yes", block 550 may be following by block 560, "generating a first image pattern based on the article details and the route. Alternatively, the process 501 may proceed to block 530 or block 510. Block 560 may be followed by block 570, "projecting the first image pattern to the retro-reflective article." Block 570 may be followed by block 580, "alternatively projecting the first image pattern and a second image pattern to the retro-reflective article." And the process 501 may be repeated starting at block 510. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

In one implementation, the process 501 may be invoked upon receiving a message from the GPS 136 during routing guidance. For example, when a particular vehicle maneuver (e.g., making a turn to a street, entering or exiting a highway, etc.) is coming, the GPS 136 may forward the detail of this maneuver to the navigation control system 130, so that its navigation controller 135 of the navigation control system 130 may instruct the camera 131 to start taking images or video clips of the environment surrounding the vehicle. Afterward, the captured images may be forwarded to process 501 for further processing.

At block 510, a navigation control system may receive an image of the road in front of or on the side of a vehicle. The image may contain one or more retro-reflective articles. In one implementation, the retro-reflective articles may be traffic signs, and may contain article identifications such as sign ids. At block 520, the image searching unit of the navigation control system may determine whether there is any retro-reflective article present in the image received at block 510. In one implementation, the image searching unit may scan the image for recognizable patterns. For example, if the sign id is in a barcode pattern, the image searching unit may quickly pick out the barcode pattern, and determine that the retro-reflective article is present in the image. Alternatively, the navigation control system may emit a special frequency light, and search for the existence of the retro-reflective articles in the image by filtering out lights with different frequencies. Due to its retro-reflective nature, the traffic signs may show a high light intensity, which may be a clear indication of their existence in the image.

In one implementation, if the determination at block 520 results in no retro-reflective article being found in the image, process 501 proceeds to block 510 to receive a new image for continuous processing. If the determination at block 520 is "Yes", process 501 proceeds to block 530. In one implementation, block 530 may be optional, since in one implementation, the article identification may already be extracted from the image before the retro-reflective article being detected in the image. Alternatively, if the retro-reflective article is detected from the image before the article identification, such as when using special frequency light, then block 530 may perform the extracting of the article identification from the image by using the above image processing mechanisms.

At block 540, based on the article identification extracted beforehand, the navigation controller of the navigation control system may obtain article details of the retro-reflective article. For example, the article details may describe, without limitation, the current location of the traffic sign, the direction the traffic sign is facing, and the content of the sign. In one implementation, the article details may be retrieved either from a database maintained by a GPS system, or from a remote database via a wired or wireless network.

At block 550, the navigation controller may determine whether the retro-reflective article is relevant to a route based on the article details obtained at block 540. The route guidance, which may be provided by a GPS system, may include the various maneuvers from a starting point toward the destination. Thus, each maneuver in the route information may contain an action and a specific geographic location. For example, a maneuver may suggest an action (e.g., "turning right", "exiting", and others) on a geographic location (e.g., "$3^{rd}$ street", "highway 1", and others). If the navigation controller determines that a particular traffic sign may be useful to the driver in performing the action or finding the geographic location of the next maneuver, then it may deem that the retro-reflective article is relevant to the route. For example, if the next maneuver is to turn right toward Tokyo, then the navigation controller may determine that a traffic sign 330 of FIG. 3 may be relevant to the route.

In one implementation, if the navigation controller determines at block 550 that a particular retro-reflective article is not relevant to the route, then process 501 proceeds to block 530 to process another retro-reflective article detected from the image. In this case, this particular retro-reflective article may be a road sign that are not useful for the route. If no more yet-to-be-processed retro-reflective article is present in the image, the process 501 may proceed to block 510 to obtain a new road image. If the determination at block 550 returns "Yes", process 501 may proceed to block 560.

At block 560, a first image pattern may be generated based on the article details and the route. For example, based on the route guidance, the next maneuver may be a right turn toward Tokyo. The navigation controller may then analyze the article details of a particular traffic sign, and notice that the traffic sign contains a right turn direction toward Tokyo. Thus, the navigation controller may generate an image pattern that is similar to image pattern 310 of FIG. 3, so that when projected onto the traffic sign, the right turn direction of the traffic sign may be highlighted. Further, the navigation controller may generate a second image pattern similar to the image pattern 320 of FIG. 3 in order to create a blinking effect on the traffic sign.

In one implementation, the first image pattern and/or the second image pattern may be predetermined without much customization. Thus, when projecting onto a retro-reflective article, the blinking effect created by the projecting of the first and the second image patterns may be sufficient for attracting the driver's attention. Alternatively, the first image pattern and/or the second image pattern may be in a form that can be projected by laser beams.

At block 570, the first image pattern, and optionally the second image pattern, may be transmitted to a projecting control unit. Based on the position of the traffic sign in the image obtained at block 510, the projecting control unit may determine a projecting angle and control a projector to project the image patterns to the traffic sign. At block 580, the projecting control unit may alternatively projecting the first image pattern and the second image pattern onto the traffic sign, thereby creating a blinking effect from the perspective of the vehicle and its driver.

Figure 6:
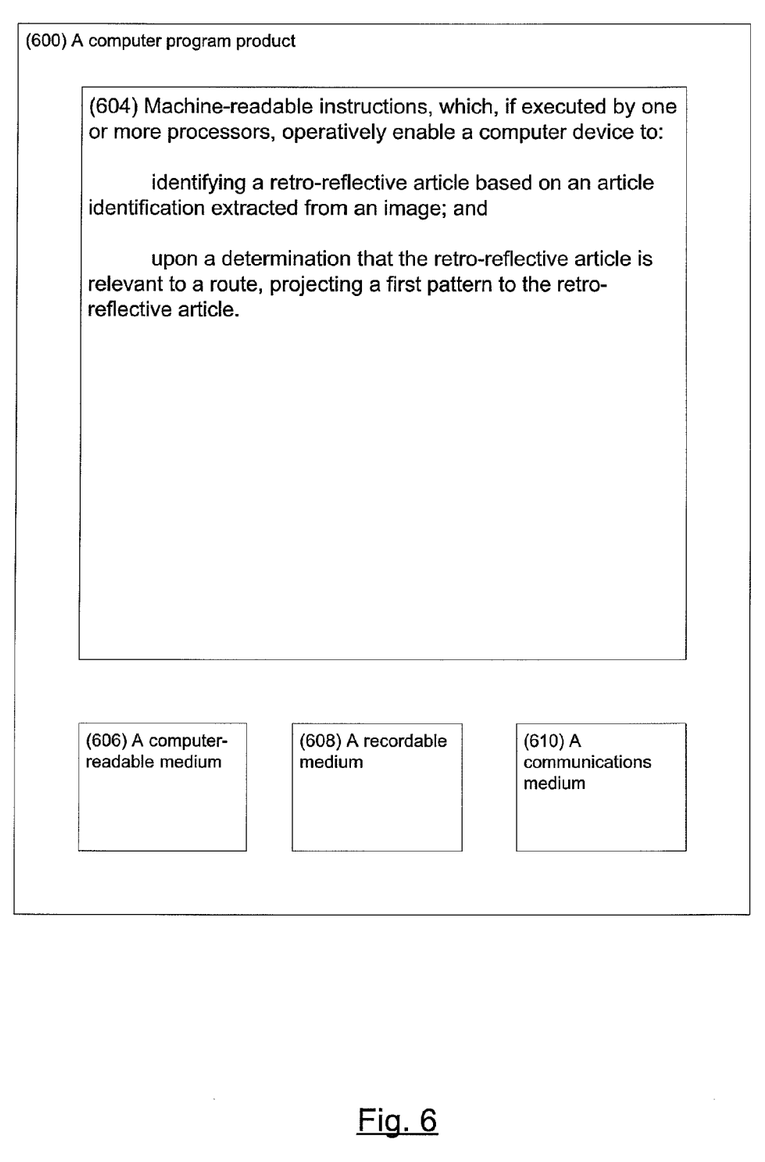
FIG. 6 illustrates an example computer program product.

FIG. 6 illustrates an example computer program product 600 that is arranged in accordance with the present disclosure. Program product 600 may include one or more machine-readable instructions 604, which, if executed by one or more processors, may operatively enable a computing device to provide the functionality described above. Thus, for example, referring to the navigation control system of FIG. 1, navigation controller may undertake one or more of the actions shown in at least FIG. 5 in response to instructions 604.

In some implementations, the program product 600 may encompass a computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, the program product 600 may encompass a communications medium 610, such as, but not limited to, a digital and/or an analog communication medium (e.g., a fiber optic cable, a wired communications link, a wireless communication link, etc.).

Figure 7:
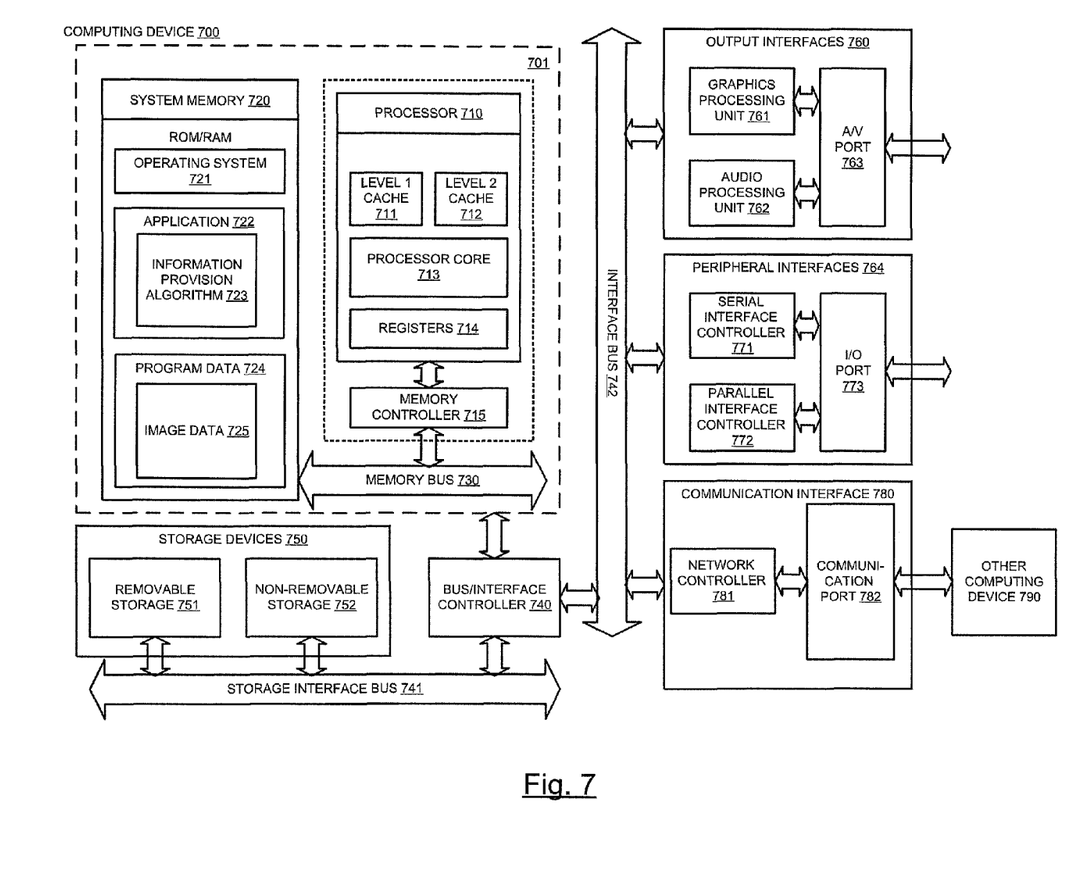
FIG. 7 is a block diagram illustrating an example computing device, all arranged in accordance with at least some embodiments of the present disclosure.

FIG. 7 is a block diagram illustrating an example computing device 700 that is arranged in accordance with the present disclosure. In one example configuration 701, computing device 700 may include one or more processors 710 and system memory 720. A memory bus 730 can be used for communicating between the processor 710 and the system memory 720.

Depending on the desired configuration, processor 710 may be of any type including but not limited to a microprocessor (μP), a microcontroller (μC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include an information provision algorithm 723 in a navigation control system 130 (FIG. 1) that is arranged to perform the functions and/or operations as described herein including the functional blocks and/or operations described with respect to process 500 of FIG. 5. Program Data 724 may include image data 725 for use in information provision algorithm 723. In some example embodiments, application 722 may be arranged to operate with program data 724 on an operating system 721. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more A/V ports 763. Example peripheral interfaces 760 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which may be arranged to facilitate communications with one or more other computing devices 790 over a network communication via one or more communication ports 782. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or a firmware configuration; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), ARM Processors, CPUs or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of the skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, Flash Memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

We claim:

1. An information provision device, comprising:
   an image search unit configured to detect, from an image, a retro-reflective article and an article identification associated with the retro-reflective article;
   a projection control unit configured to control projection of an image pattern to the retro-reflective article; and
   a controller coupled with the image search unit and the projection control unit, wherein in response to a determination that the retro-reflective article pertains to a route sought to be traveled, the controller is configured to generate, based on the article identification and the route, the image pattern to be projected to the retro-reflective article, and the image pattern is configured to highlight a specific area of the retro-reflective article that pertains to the route sought to be traveled.

2. The information provision device as recited in claim 1, further comprising:
   a global positioning system (GPS) coupled with the controller, wherein the GPS is configured to provide information related to the route to the controller.

3. The information provision device as recited in claim 1, further comprising:
   a camera coupled with the image search unit, wherein the camera is configured to capture the image that contains the retro-reflective article.

4. The information provision device as recited in claim 1, further comprising:
   a projector coupled with the projection control unit, wherein the projector is controlled by the projection control unit to project the image pattern to the retro-reflective article.

5. The information provision device recited in claim 4, wherein the retro-reflective article is a traffic sign with a retro-reflective surface and the article identification.

6. The information provision device as recited in claim 5, wherein the retro-reflective surface allows the image pattern projected from the projector to be directed back to the information provision device.

7. The information provision device as recited in claim 5, wherein the retro-reflective article is detected from the image based on light returned by the retro-reflective surface.

8. The information provision device as recited in claim 1, wherein the article identification is identified by a scan of the image for a recognizable pattern.

9. A retro-reflective article, comprising:
   a base substance having a surface to display information;

a retro-reflective mechanism to enable the surface of the base substance to reflect an image pattern projected onto the surface; and an article identification coupled with the base substance, wherein the article identification is configured to identify the retro-reflective article, and the image pattern is generated based on the article identification and a route sought to be traveled and is configured to highlight a specific area of the retro-reflective article that pertains to the route sought to be traveled.

10. The retro-reflective article as recited in claim 9, wherein the surface of the base substance is printed with traffic direction information.

11. The retro-reflective article as recited in claim 9, wherein the article identification is recognizable in an image that contains the retro-reflective article.

12. An information provision method, comprising:
identifying, by a controller, a retro-reflective article based on an article identification in a request; and
in response to a determination that the retro-reflective article pertains to a route sought to be traveled, projecting, by a projection control unit coupled with the controller, a first image pattern to the retro-reflective article, wherein the first image pattern is generated based on the article identification and the route, and the first image pattern is configured to highlight a specific area of the retro-reflective article that pertains to the route sought to be traveled.

13. The method as recited in claim 12, further comprising: alternatively projecting the first image pattern and a second image pattern to the retro-reflective article.

14. The method as recited in claim 12, further comprising: obtaining article details of the retro-reflective article based on the article identification, wherein the determination of whether the retro-reflective article pertains to the route sought to be traveled includes evaluating the article details and the route.

15. The method as recited in claim 14, wherein the determination of whether the retro-reflective article pertains to the route sought to be traveled further comprises:
receiving a location information related to the route from a GPS; and
evaluating the location information and the article details to determine relevance.

16. The method as recited in claim 14, further comprising:
generating the first image pattern based on the article details and the route.

17. The method as recited in claim 12, further comprising:
receiving an image captured by a camera; and
in response to a determination that the retro-reflective article is present in the image, extracting the article identification for the retro-reflective article from the image.

18. The method as recited in claim 12, wherein the retro-reflective article is a traffic sign having a retro-reflective surface to direct the first image pattern back to the controller.

19. The method as recited in claim 12, wherein the projecting of the first image pattern to the retro-reflective article comprises:
determining a projecting angle of the retro-reflective article with respect to a vehicle; and
projecting the first image pattern according to the projecting angle.

20. The method as recited in claim 12, wherein the method is embodied in a non-transitory machine-readable medium as a set of instructions which, in response to execution by a computing processor, cause the computing processor to perform the method.

* * * * *

UNITED STATES PATENT AND TRADEMARK OFFICE
CERTIFICATE OF CORRECTION

PATENT NO.      : 8,767,066 B2
APPLICATION NO. : 12/645496
DATED           : July 1, 2014
INVENTOR(S)     : Uehira et al.

It is certified that error appears in the above-identified patent and that said Letters Patent is hereby corrected as shown below:

In the Drawings

In the drawing sheets, consisting of Figs. 6 and 7, should be deleted to be replaced with the drawing sheets, consisting of Figs. 6 and 7, as shown on the attached pages.

Signed and Sealed this
Fourteenth Day of April, 2015

Michelle K. Lee
*Director of the United States Patent and Trademark Office*

(600) A computer program product
(602) Signal Bearing Medium (604) Machine-readable instructions, which, if executed by one or more processors, operatively enable a computer device to:

identifying a retro-reflective article based on an article identification extracted from an image; and upon a determination that the retro-reflective article is relevant to a route, projecting a first pattern to the retro-reflective article.

(606) A computer-readable medium (608) A recordable medium (610) A communications medium

Fig. 6